United States Patent [19]

Helmer-Metzmann et al.

[11] Patent Number: 5,438,082

[45] Date of Patent: Aug. 1, 1995

[54] POLYMER ELECTROLYTE MEMBRANE, AND PROCESS FOR THE PRODUCTION THEREOF

[75] Inventors: Freddy Helmer-Metzmann, Mainz; Frank Osan, Kelkheim/Taunus; Arnold Schneller, Mainz; Helmut Ritter, Wuppertal; Konstantin Ledjeff, Krozingen; Roland Nolte, Freiburg; Ralf Thorwirth, Wuppertal, all of Germany

[73] Assignee: Hoechst Aktiengesellschaft, Frankfurt am Main, Germany

[21] Appl. No.: 75,219

[22] Filed: Jun. 10, 1993

[30] Foreign Application Priority Data

Jun. 13, 1992 [DE] Germany .............. 42 19 412.1
Dec. 17, 1992 [DE] Germany .............. 42 42 692.8

[51] Int. Cl.⁶ .............. C08G 12/00; C08J 3/24; C08F 2/48
[52] U.S. Cl. .............. 522/149; 522/162; 522/166; 522/904; 522/905; 525/391; 525/397; 525/471; 528/125; 528/128; 528/175; 528/226; 528/229
[58] Field of Search .............. 522/35, 149, 904, 905, 522/136, 162, 166; 525/471, 391, 397; 528/128, 125, 226, 229, 175

[56] References Cited

U.S. PATENT DOCUMENTS 4,755,540 7/1988 Blakey .............. 521/62
5,028,337 7/1991 Linder et al. .............. 210/642
5,254,223 10/1993 Josowicz et al. .............. 522/20

FOREIGN PATENT DOCUMENTS 0008895 3/1980 European Pat. Off. .
0041780 12/1981 European Pat. Off. .
0182506 5/1986 European Pat. Off. .

OTHER PUBLICATIONS

German Abstract DE 3402-471-A, Jan. 25, 1984.
German Abstract DE 3321-860-A, Jun. 16, 1983.

*Primary Examiner*—Susan W. Berman
*Attorney, Agent, or Firm*—Curtis, Morris & Safford

[57] ABSTRACT

In order to produce a polymer electrolyte membrane from sulfonated, aromatic polyether ketone, an aromatic polyether ketone of the formula (I)

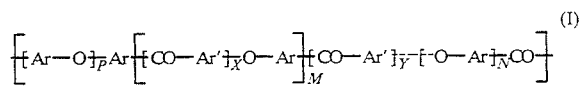

in which
Ar is a phenylene ring having p- and/or m-bonds,
Ar' is a phenylene, naphthylene, biphenylene, anthrylene or another divalent aromatic unit,
X, N and M, independently of one another are 0 or 1,
Y is 0, 1, 2 or 3,
P is 1, 2, 3 or 4, is sulfonated and the sulfonic acid is isolated. At least 5% of the sulfonic groups in the sulfonic acid are converted into sulfonyl chloride groups, and these are reacted with an amine containing at least one crosslinkable substituent or a further functional group, and unreacted sulfonyl chloride groups are subsequently hydrolyzed. The resultant aromatic sulfonamide is isolated and dissolved in an organic solvent, the solution is converted into a film, and the crosslinkable substituents in the film are then crosslinked.

In specific cases, the crosslinkable substituents can be omitted. In this case, sulfonated polyether ketone is converted into a film from solution.

11 Claims, No Drawings

POLYMER ELECTROLYTE MEMBRANE, AND PROCESS FOR THE PRODUCTION THEREOF

The invention relates to polymer electrolyte membranes based on a sulfonated aromatic polyether ketone.

Cation exchanger membranes are employed, inter alia, in electrochemical cells which use, instead of a liquid electrolyte, a polymeric solid electrolyte as ion conductor. Examples of these are water electrolyzers and hydrogen/oxygen fuel cells. Membranes for this application must satisfy stringent demands with respect to chemical, electrochemical and mechanical stability and proton conductivity. For this reason, hitherto only fluorinated membranes which principally contain sulfonic exchanger functions, have successfully been employed in long-term operation, for example in chloralkali electrolysis.

Although the use of fluorinated exchanger membranes constitutes the state of the art, they have disadvantages for use in solid electrolyte applications. In addition to the high cost, such materials having the above-required properties are, in membrane form, only available with defined parameters (thickness, exchanger capacity) and can be processed neither thermoplastically nor as solutions. However, it is precisely applications as a polymeric solid electrolyte in fuel cells/electrolysis that require membranes having modifiable properties, enabling optimum matching of the membrane properties to the requirements in the cell.

The modifiable properties include variation of the membrane thickness, since, in particular at high current densities, the resistance, which is proportional to the membrane thickness, makes up a considerable proportion of the electrical losses of the cell. Commercial perfluorinated membranes typically have a thickness of from 170 to 180 $\mu$m; thicknesses of less than 0.1 mm are desirable. Polymers which allow thermoplastic or solution processing enable membranes to be produced in any desired thickness.

The modifiable properties include the degree of cross-linking of the membrane. The low membrane resistance required causes a high ion exchange capacity of the membrane. However, all chemically uncrosslinked membranes (these also include commercial perfluorinated membranes) have a limited ion exchange capacity in practice since the membrane swells considerably with increasing value, in particular at elevated temperatures, and its mechanical properties become inadequate. However, polymer materials which, after conversion into a membrane, are in principle chemically crosslinkable offer the opportunity of restricting swelling.

Although polymers typically used for cation exchanger membranes, such as, for example, sulfonated polystyrenes, can be prepared from liquid monomers and can be polymerized in membrane form of any desired thickness after addition of crosslinker molecules, the hydrogen atoms on the main aliphatic chain mean, however, that they do not have the long-term chemical stability which is required.

Further properties which distinguish a good cation exchanger membrane are insensitivity during operating interruptions, resistance to delamination of a support film and (in the case of alkali metal chloride electrolysis) insensitivity to brine impurities.

The object was therefore to provide ion-conductive membranes which are suitable for use as polymeric solid electrolytes, have adequate chemical stability and can be produced from polymers which are soluble in suitable solvents. It should preferably be possible to make these membranes more stable by subsequent treatment.

This object is achieved by a process for the production of a polymer electrolyte membrane from sulfonated, aromatic polyether ketone, in which an aromatic polyether ketone of the formula (I)

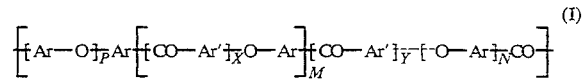

in which
Ar is a phenylene ring having p- and/or m-bonds,
Ar' is a phenylene, naphthylene, biphenylylene, anthrylene or another divalent aromatic unit,
X, N and M, independently of one another, are 0 or 1,
Y is 0, 1, 2 or 3,
is 1, 2, 3 or 4,
is sulfonated, the sulfonic acid is isolated and dissolved in an organic solvent, and the solution is converted into a film. This process comprises converting at least 5% of the sulfonic acid groups in the sulfonic acid into the sulfonyl chloride groups, reacting the sulfonyl chloride groups with an amine containing at least one crosslinkable substituent or a further functional group, where from 5% to 25% of the original sulfonic groups are converted into sulfonamide groups, subsequently hydrolyzing unreacted sulfonyl chloride groups, isolating the resultant aromatic sulfonamide and dissolving it in an organic solvent, converting the solution into a film, and then crosslinking the crosslinkable substituents in the film.

Asymmetrical membranes derived from a sulfonated, aromatic polyether ketone are the subject-matter of EP-A-182 506. However, the membranes described therein contain no crosslinkable or crosslinked groups.

The sulfonation of the polyether ketone of the formula (I) is preferably carried out by dissolving it in from 94 to 97% strength by weight sulfuric acid, adding a sulfonating agent to the resultant solution until the concentration of sulfuric acid is from 98 to 99.5% by weight, and working up the reaction batch as soon as the desired degree of sulfonation has been reached. It is favorable to work under conditions under which sulfonation is substantially suppressed or under which sulfonation does not yet occur.

The aromatic polyether ketones indicated in the formula (I) are readily accessible. They can in principle be built up by electrophilic polycondensation by the Friedel-Crafts method, in which an aromatic diacid dihalide is reacted with an aromatic ether.

In the polymers of the formula I, the indices are preferably matched in such a way that $P=2-(1-X).M$.

The polymer where $P=1$, $X=0$, $M=1$, $Y=0$ and $N=0$ is commercially available under the name ®Victrex. Polymers in which $N=1$ or $Y=3$ or $P=4$ or $X=1$ can preferably be prepared by a nucleophilic process.

It is preferred for all the divalent aromatic radicals —Ar— in the polymer to be sulfonated to comprise phenylene, preferably 1,4-phenylene. The sulfonating agent, which serves to increase the sulfuric acid concentration and for sulfonation, is preferably fuming sulfuric acid, chlorosulfonic acid or sulfur trioxide.

The concentration of the sulfuric acid used for the dissolution is preferably from 96 to 96.5%. The dissolution temperature depends on the ratio between the number of ether bridges and carbonyl bridges. With increasing proportion of ether groups relative to carbonyl groups, the reactivity of the polyether ketone main chain for electrophilic substitution (for example sulfonation) increases.

The number of sulfonic acid groups which can be introduced depends on the number of aromatic rings bridged by oxygen atoms. Only O-phenyl-O units are sulfonated under the stated conditions, while O-phenyl-CO groups remain unsulfonated. In general, the temperature during dissolution of the polymer is between 10° and 60° C., in particular between 20° and 60° C. preferably between 30° and 50° C. During this dissolution process, sulfonation of the main chain is substantially suppressed. Our own NMR studies have shown that no degradation occurs during sulfonation.

After complete dissolution of the sample, the concentration of the sulfuric acid is increased, for example by adding oleum, until the $H_2SO_4$ concentration is from 98 to 99.9% by weight, in particular from 98 to 99.5% by weight, preferably from 98.2 to 99.5% by weight. The reaction temperature during the actual sulfonation can be higher than during the dissolution process. In general, the sulfonation is carried out at from 10° to 100° C. in particular at from 30° to 90° C. preferably at from 30° to 80° C. Both an increase in the temperature and an extension of the reaction time increase the degree of sulfonation of the polymer. Typical reaction times are between 0.5 and 10 hours, in particular between 1 and 8 hours, preferably between 1.5 and 3 hours. Reaction times of longer than 10 hours only increase the degree of sulfonation to an insignificant extent. An increase in the temperature of the solution to at least 50° C. after addition of the sulfonating agent considerably accelerates the sulfonation.

The sulfonation is preferably carried out on homopolymers of the formula IV or V or VI. In a further embodiment of the invention, the process described is employed for the sulfonation of a copolymeric aromatic polyether ketone built up from at least two different units of the formula IV, V and/or VI

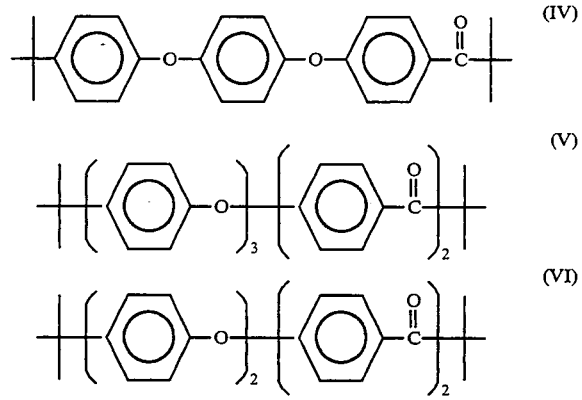

A further preferred embodiment of the process according to the invention comprises employing a polyether ketone built up from units of the formula V or VI and additional non-sulfonatable units. The sulfonation of copolymers comprising monomer units of the formula IV and non-sulfonatable ether ketone units is described in EP-A-41 780 and EP-A-08 895. For complete sulfonation of a homopolymer of the formula IV, under the same conditions, a fully water-soluble product having very high swellability in water at room temperature which is very difficult to isolate would be obtained. These properties are undesired, for example, for use of polysulfonic acids as hydrophilic ion exchanger membranes in electrolysis cells, since significant swelling results in loss of the mechanical stability of the membrane. On the other hand, however, a high ion exchanger capacity in particular requires a high degree of sulfonation.

Also in this process, the polyether ketone is dissolved in from 94 to 97% strength by weight sulfuric acid. A sulfonating agent is added to the resultant solution until the sulfuric acid concentration is from 98 to 99.5% by weight. The reaction batch is worked up as soon as the desired degree of sulfonation has been reached.

The non-sulfonatable units preferably have the formula XIIIa

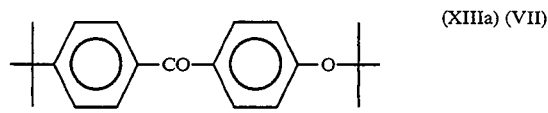

(XIIIa) (VII)

and are then formally derived from 4-hydroxybenzophenone or have the formula XIIIb

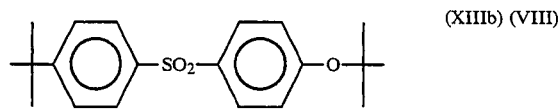

(XIIIb) (VIII)

and are then derived from 4-hydroxybenzosulfone.

The polymer of the formula IV is dissolved in from 95 to 96.5% strength by weight sulfuric acid at a maximum of 25° C. In order to dissolve the polymer of the formula V in from 94 to 96% strength by weight sulfuric acid, a temperature of 30° C. is preferably used. The homopolymer of the formula VI is preferably dissolved in from 95 to 96.5% strength by weight sulfuric acid at from 25° to 50° C. and is subsequently sulfonated at temperatures at from 60° to 90° C. The polymers of the formula I are dissolved at 25° C. The actual sulfonation is then carried out at at least 50° C. and at an acid concentration of at least 98.5% by weight of $H_2SO_4$.

The conversion of some of the sulfonic acid groups into sulfonyl chloride groups is carried out by known methods. For example, the isolated sulfonic acids can be reacted with the calculated amount of $PCl_5$ or thionyl chloride in an inert solvent or in excess thionyl chloride. Suitable amines which react with the sulfonic acid groups and introduce crosslinkable substituents are all aliphatic or aromatic amines which contain the divalent, polymerizable radical —CH=CH—, for example allylamine, p-aminocinnamic acid and $C_1$-$C_4$-alkyl esters of p-aminocinnamic acid. If the amines which react with the $SO_2Cl$ group contain a further functional group, this should be capable of additional reaction to further functional groups G. Reaction of the resultant sulfonamide with a compound G-E-G in which E is a bridging member links to two polymeric aryl ether ketone sulfonic acids by means of functional groups. An example which may be mentioned of an appropriate amine containing a functional group is 2-aminomethylfuran, the N-furylmethylsulfonamide obtained therefrom condensing with a substituted maleic anhydride in a Dieis-Alder reaction to form two non-aromatic six-membered rings.

The reaction of the sulfonyl chloride groups with the amine is preferably carried out in an inert solvent, for example in chloroform or dichloroethane. Replacement of a sulfonic group by a substituted sulfonamide group increases the solubility in organic solvents, for example N-methylpyrrolidone or dimethyl sulfoxide. The dissolution of polymeric, aromatic aryl ether ketone sulfonic acids (containing no further functional groups) in organic solvents and further conversion of the solution into a film belongs to the prior art. Corresponding solvents are indicated, for example, in EP-A-0 142 973.

The hydrolysis of unreacted sulfonyl chloride groups is carried out by aqueous work-up.

The polymeric sulfonic acid prepared in this way preferably has the formula (VII)

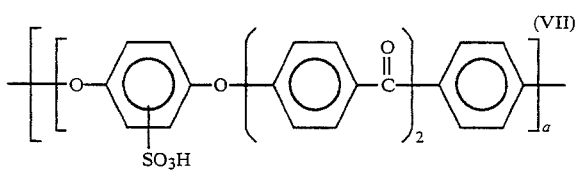

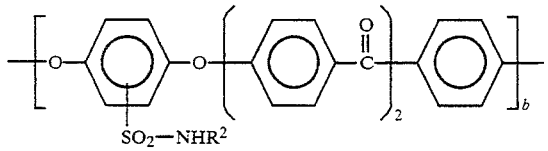

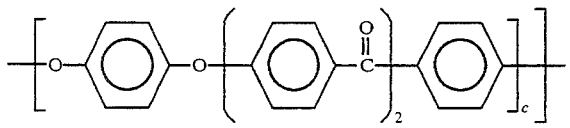

where
a is a number from 0.15 to 0.95,
b is a number from 0.05 to 0.25,
c is a number from 0 to 0.8,
a+b is a number from 0.2 to 1.0, and
a+b+c=1, and
$R^2$ is selected from the radicals

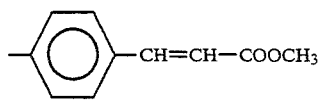

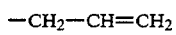

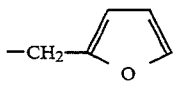

After the polymer electrolyte membrane has been produced by said process according to the invention, the cross-linkable substituents are crosslinked, advantageously by means of high-energy radiation or heat, or the functional groups introduced with the amine are subjected to a condensation reaction, in particular a cycloaddition reaction, by treatment with suitable compounds.

The crosslinking of the membrane very greatly reduces the swelling in water, in particular at elevated temperature. This is favorable for use of the membrane in fuel cells or electrolysis cells.

For certain purposes, certain uncrosslinked, aromatic polyether ketone sulfonic acids are also suitable as a material for membranes. For example, DE-A-3 402 471 and DE-A-3 321 860 describe cation exchanger membranes which can be obtained from aromatic ether ether ketones of the formula (IV) by sulfonation. The invention therefore furthermore relates to a process for the production of a polymer electrolyte membrane based on a sulfonated aromatic polyether ketone which contains no crosslinked or crosslinkable groups. To this end, an aromatic polyether ketone is sulfonated, the resultant sulfonic acid is isolated and dissolved in an organic solvent, in particular an aprotic, polar solvent, and the solution is converted into a film. In an embodiment of this process, the sulfonic acid used has the formula (II)

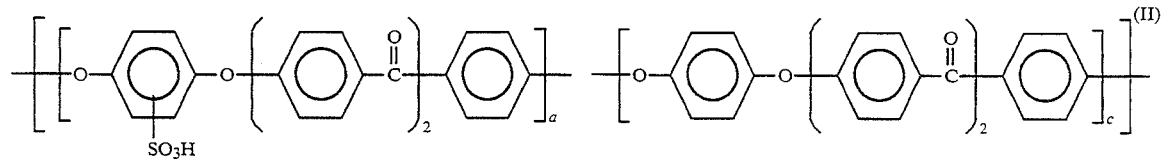

where a=0.2 to 1.0, c=0 to 0.8, and a+c=1.

In a further embodiment of this process, the sulfonic acid used has the formula (III)

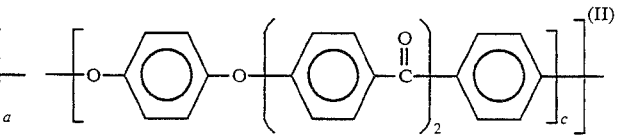

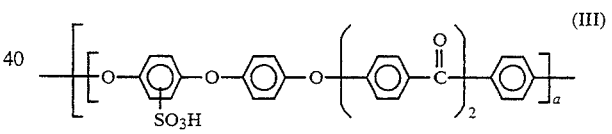

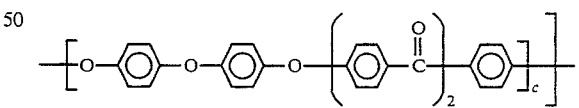

where
a=0 to 1,
b=0 to 1,
c=0 to 0.5, and
a+b+c=1.

It is obtainable by sulfonation of the homopolymer of the formula V. The sulfonation first gives monosubstitution products (b=0) in which a is between 0.5 and 1 and c is between 0 and 0.5. a then reaches a maximum (about 1), while b remains low and c drops back to low values. Finally, disulfonation occurs, and the value b increases at the expense of a.

The polymer electrolyte membranes described contain sulfonic groups and are derived from aromatic aryl ether ketones. Irrespective of whether they additionally contain crosslinked or uncrosslinked sulfonamide groups, they are suitable as proton-conducting solid electrolyte membranes in fuel cells or electrolysis cells. Since the polymeric sulfonic acids are uncrosslinked at the time of their further conversion, they are soluble in suitable polar solvents, such as dimethylformamide, NMP, DMAc and DMSO. The resultant solution preferably has a molarity of between 50 and 450 g/l. It is cast onto a substrate, and subsequent evaporation of the solvent gives a homogeneous membrane. Alternatively, the solution can, in order to set a defined membrane thickness, be distributed over the substrate by means of a hand coater of defined wet-film thickness, and thicknesses in the range of, for example, from 0.05 to 0.4 mm can be achieved. By the same principle, support fabrics or microporous to porous support membranes, for example made of polyethylene, polypropylene, polytetrafluoroethylene or glass, can be brought into contact with the abovementioned solution, and the solvent is subsequently evaporated. In general, the polymeric sulfonic acids and sulfonic acid derivatives employed have molecular weights of at least 30,000.

The resultant membrane forms a special case of a polymer electrolyte membrane, whose material is obtained from an aromatic polyether ketone of the formula (I) by sulfonation. These membranes can be employed as solid electrolytes for fuel cells and electrolysis cells. If the membrane has been produced from a solution of a polymeric sulfonic acid of the formula (VII), crosslinking in the polymer electrolyte membrane gives a sulfonated aromatic polyether ketone of the formula (VIII)

been dimerized by means of light or heat, A is a radical of the formula (IX)

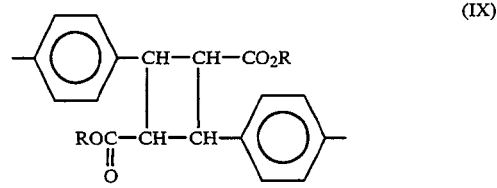

in which R is, in particular, hydrogen or methyl. If the sulfonyl chloride groups have been reacted with 2-amino-methylfuran and the linking of the radicals derived from this amine has been carried out with a bis-maleimide, the radical A has the formula (X)

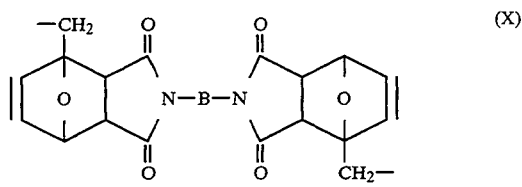

where B is a divalent radical, for example an alkylene chain having 1 to 4 carbon atoms, a phenylene radical, a diphenyl ether radical, a 2,2-bisphenylpropane radical or a 2,2-bisphenoxyphenylpropane radical.

Alternatively, mixtures of polymeric, crosslinkable sulfonamides and polymeric, non-crosslinkable, aromatic sulfonic acids can be converted jointly into mem-

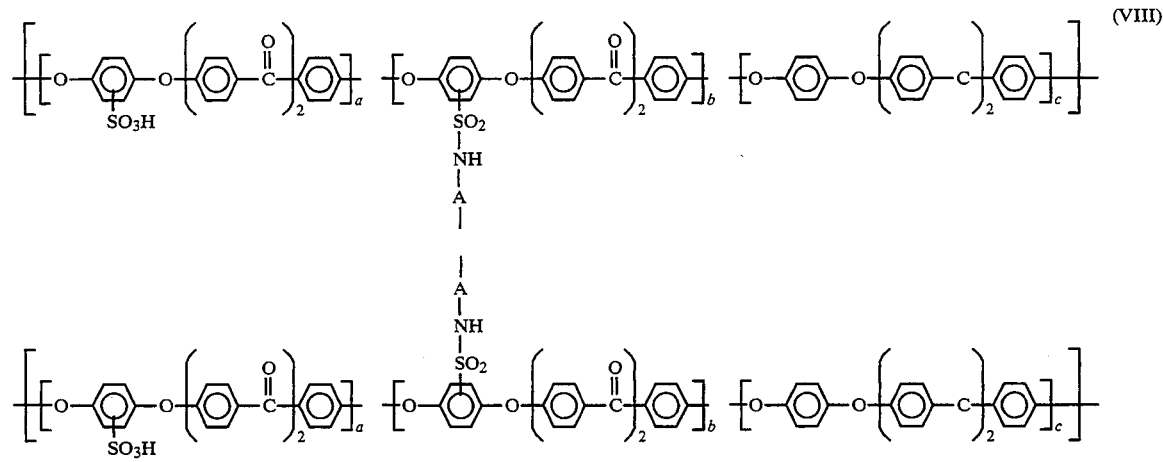

where
$a$ is a number from 0.15 to 0.95,
$b$ is a number from 0.05 to 0.25,
$c$ is a number from 0 to 0.8,
$a+b$ is a number from 0.2 to 1.0, and
$a+b+c=1$,
and where A is a divalent ring system formed by cycloaddition. If a para-aminocinnamic ester was employed in the reaction of the sulfonyl chloride groups and the reactive terminal groups derived from this ester have branes. Here also, the advantage occurs that crosslinking greatly reduces the swelling in water. For example, a crosslinkable sulfonic acid derivative of the formula (VII) can be combined with a sulfonic acid obtained from the sulfonation of the compound of the formula (I). The resultant mixture is converted into a membrane and (VII) is later crosslinked. The uncrosslinkable sulfonic acid preferably has the formula (II) and the crosslinkable sulfonic acid derivative preferably has the formula (XII)

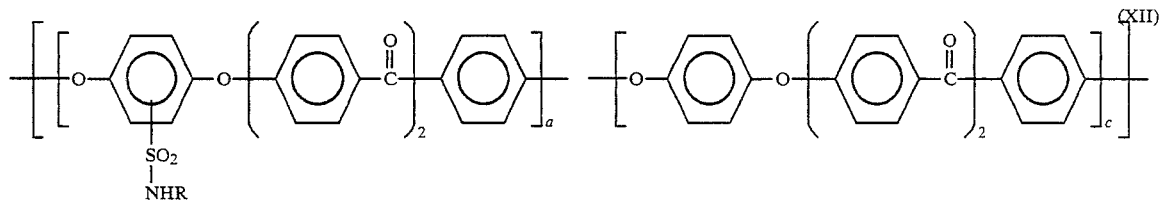

where R is a crosslinkable substituent, for example NH$_2$R is allylamine or p-aminocinnamic acid, and a=0 to 1, c=0 to 0.5 and a+c=1.

After the crosslinking (by light, heat or the effect of crosslinking chemicals), the component comprising the crosslinkable derivative of the formula XII is converted into a crosslinked sulfonic acid derivative of the formula XI

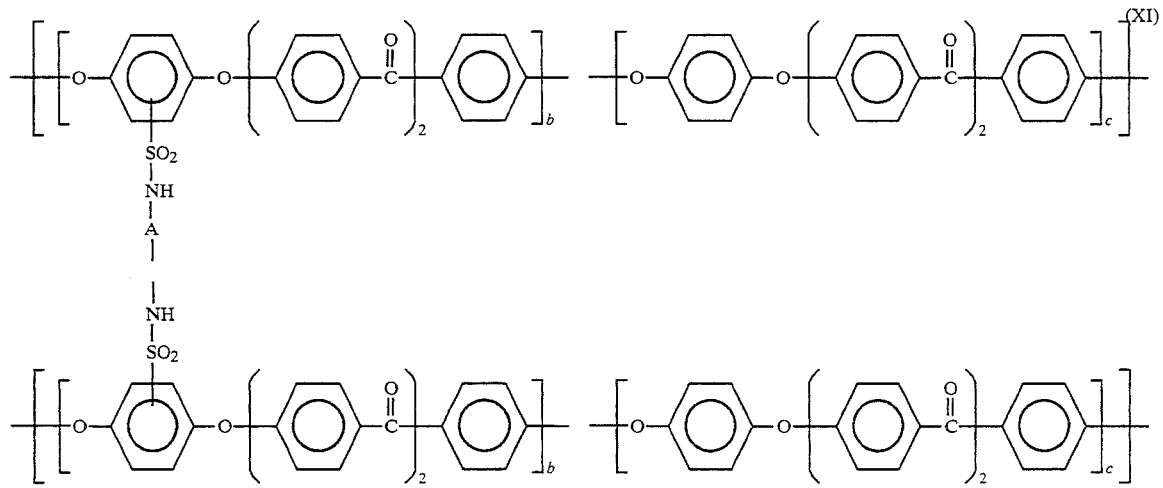

in which b=0.5 to 1, c=0 to 0.5, b+c=1, and A is a divalent ring system formed by cycloaddition.

In this case, the proportion of (XII) is advantageously from 0.5 to 25% by weight and the proportion of (II) is advantageously from 75 to 99.5% by weight.

For use of the crosslinked membrane as a solid electrolyte in an electrolysis cell or fuel cell operating by the SPE method, a catalyst must be applied to the membrane surface. This application can be achieved, for example, by installing the membrane in a coating cell in such a way that the cell is divided by the membrane into two compartments. If the readily reducible salt of a catalyst metal, for example hexachloroplatinic acid, is introduced on one side, and a reducing agent is introduced on the other, the latter diffuses through the membrane and deposits the catalytic active metal, for example platinum, on the membrane surface. Such processes have been indicated by H. Takinaka and E. Torikai in Japanese patent applications (cf. Chem. Abstracts 93(8): 83677v and Chem. Abstracts 103(26): 216571e).

Alternatively, the catalyst coating can be carried out by pressing a metal powder. For example, a platinum coating rate of from 1 to 20 mg/cm$^2$ can be achieved in this way. The pressing pressure is, for example, from 1.1 to 8.8 bar and the pressing duration is between 5 and 15 minutes. A general description of the pressing process is given in Appleby, Yeager, Energy (Oxford) 11 (1988), p. 132.

The coated membranes are tested in water electrolyzers or hydrogen/oxygen fuel cells operating on the solid electrolyte principle. The catalyst-coated membrane separates the two halves of the cells and is simultaneously responsible for ion transport. After the membrane, each half-cell additionally contains a metallic gas and current divider structure, a metallic current collector and, in the case of water electrolysis, water feed/gas discharge systems and in the case of hydrogen/oxygen fuel cells, gas feed/water discharge systems. The cells can be held at temperatures in the range from 20° to 80° C. and the membranes are subjected to a defined current density in the range from 0 to 1 A/cm$^2$ of membrane area. In the water electrolysis cell, it is possible to determine the membrane resistance in the cell by means of the impedance spectroscopy method. The swelling value Q of the membrane in percent is defined as:

$$Q = (\text{wet weight} - \text{dry weight}) \times 100/\text{dry weight}$$

The invention is described in greater detail by means of the examples.

EXAMPLE 1

96% strength concentrated sulfuric acid was introduced into a four-neck stirred apparatus with dropping funnel and oil bath, and various aromatic polyether ketones were dissolved. The acid concentration was then adjusted to from 98.5 to 99.5% by weight of H$_2$SO$_4$ by titration with oleum (content 20% of SO$_3$). The sulfonation is accelerated by a subsequent temperature increase. The final temperature depends on the respective polymer.

The experiments in Table 1 were carried out using a homopolymer of the formula (IV). The experiments in Table 2 were carried out using a homopolymer of the formula (V). The experiments in Table 3 were carried out using a homopolymer of the formula (VI). The following abbreviations have been used in the tables:

Key:
DT = Dissolution temperature
RT = Reaction temperature
Time = Reaction time
Inh. v. = Inherent viscosity measured in conc. $H_2SO_4$ at 25° C. (0.1%)
Sulf. deg. = Degree of sulfonation, determined by the sulfur content from elemental analysis (proportion of sulfonated O-phenylene-O units)

TABLE 1

|   | DT (°C.) | Acid final conc. (%) | RT (°C.) | Time (h) | Yield (%) | Inh. v. | Sulf. deg. (%) |
|---|---|---|---|---|---|---|---|
| I | 25 | 98.50 | 25 | 1.00 | >90 | — | 40 |
| II | 25 | 98.50 | 45–50 | 1.25 | >90 | — | 63 |
| III | 25 | 98.50 | 45–50 | 1.50 | >90 | 0.73 | 66 |
| IV | 40 | 98.50 | 60 | 3.00 | >90 | 0.64 | 82 |
| V | 25 | 98.50 | 50 | 1.50 | >90 | 0.71 | 77 |
| VI | 25 | 98.50 | 50 | 1.50 | >90 | 0.71 | 76 |

TABLE 2

|   | DT (°C.) | Acid final conc. (%) | RT (°C.) | Time (h) | Yield (%) | Inh. v. | Sulf. deg. (%) |
|---|---|---|---|---|---|---|---|
| I | 30 | 98.50 | 30–35 | 1.25 | >90 | 0.77 | 50 |
| II | 30 | 98.50 | 25–30 | 6.00 | >90 | 0.74 | 60 |
| III | 30 | 98.50 | 50 | 1.00 | >90 | 0.76 | 46 |
| IV | 30 | 98.20 | 50 | 4.00 | >90 | 0.67 | 69 |

TABLE 3

|   | DT (°C.) | Acid final conc. (%) | RT (°C.) | Time (h) | Yield (%) | Inh. v. | Sulf. deg. (%) |
|---|---|---|---|---|---|---|---|
| I | 45 | 98.30 | 60 | 1.00 | >90 | 0.80 | 21 |
| II | 45 | 98.30 | 70 | 0.50 | >90 | 0.80 | 31 |
| III | 45 | 98.30 | 80 | 0.50 | >90 | 0.71 | 52 |
| IV | 45 | 98.30 | 80 | 1.50 | >90 | 0.67 | 72 |
| V | 45 | 98.50 | 60 | 4.00 | >90 | 0.80 | 28 |
| VI | 45 | 98.10 | 80 | 4.00 | >90 | 0.60 | 81 |
| VII | 45 | 98.95 | 60 | 4.00 | >90 | 0.69 | 82 |
| VIII | 45 | 98.95 | 80 | 6.00 | >90 | 0.57 | 75 |
| IX | 45 | 98.40 | 80 | 3.00 | >90 | 0.70 | 91 |
| X | 45 | 99.10 | 60 | 1.00 | >90 | 0.62 | 76 |
| XI | 45 | 98.95 | 60 | 0.83 | >90 | 0.70 | 57 |

EXAMPLE 2

Sulfonation of an ether ketone 230 ml of chlorosulfonic acid were introduced into a 1 l three-neck round-bottom flask fitted with a KPG (precision glass) stirrer and cooled to −14° C. under nitrogen by means of ice/sodium chloride. 25.0 g of polyether ketone were added within 10 minutes, and rinsed with 20 ml of chlorosulfonic acid. After 1 hour, all the polyether ketone had dissolved, and the ice bath was removed. The reaction mixture warmed to 26° C. and was then kept constant at 24° C. by means of a water bath. During the entire reaction time, from 0.5 to 0.8 ml portions were removed at intervals and precipitated in about 15 ml of water. The flakes were filtered off with suction, washed with water until pH-neutral, rinsed twice with ethanol and dried at 100° C. in an oil-pump vacuum. Sulfur elemental analyses were subsequently carried out.

After a reaction duration of about 9 hours, the entire flask contents, with the exception of about 15 ml, were poured into 10 l of stirred ice/water mixture. The product which flocculated out was filtered off with suction and washed with ice-water until the washings were pH-neutral. The product was then rinsed with ethanol and ether and dried in vacuo at about 80° C. The 15 ml of reaction solution were worked up correspondingly after about 29 hours. The dependence of the degree of sulfonation on the reaction duration is shown in Table 2. The degree of sulfonation was calculated from the S/C ratio in the elemental analysis.

The solubility in hot dimethylformamide, dimethyl sulfoxide and N-methylpyrrolidone increases with an increasing degree of sulfonation.

TABLE 2

| Degree of sulfonation of individual samples | | |
|---|---|---|
| Min. | Temp. (°C.) | Sulf. deg. (%) | Sulfur (%) |
| 30 | −12 | 16.8 | 1.14 |
| 60 | −8 | 19.7 | 1.34 |
| 85 | 13 | 39.9 | 2.71 |
| 110 | 22 | 61.4 | 4.17 |
| 135 | 26 | 74.5 | 5.06 |
| 175 | 24 | 85.9 | 5.83 |
| 200 | 24 | 86.3 | 5.86 |
| 225 | 24 | 87.2 | 5.92 |
| 250 | 24 | 88.8 | 6.03 |
| 280 | 24 | 86.9 | 5.90 |
| 305 | 24 | 87.6 | 5.95 |
| 335 | 24 | 89.0 | 6.04 |
| 375 | 24 | 87.2 | 5.92 |
| 405 | 24 | 89.4 | 6.07 |
| 435 | 24 | 88.5 | 6.01 |
| 470 | 24 | 88.7 | 6.02 |
| 500 | 24 | 89.1 | 6.06 |
| 530 | 24 | 90.0 | 6.11 |
| 560 | 24 | 89.5 | 6.08 |
| 1760 |  | 94.6 | 6.42 |

The sulfonation of the polyether ketone can also be followed by means of the —C-NMR spectra. The signal at 142.0 ppm demonstrates sulfonation of the hydroquinone unit. The weak signal at 119.0 ppm is caused by unsubstituted hydroquinone units. The same result is also given by the signal at 159.7 ppm, which is produced by the carbon which is bonded to the hydroquinone unit via an ether bond and has a keto function in the para position. The corresponding carbon atom adjacent to a sulfonated hydroquinone unit has signals at 161.5 and 162.8 ppm.

EXAMPLE 3

Preparation of a sulfonyl chloride 250 ml of thionyl chloride and 30 drops of DMF are added with stirring to 12.5 g of the sulfonated polyether ketone from Example 2 in a 2 l three-neck round-bottom flask. This is accompanied by vigorous evolution of gas. The mixture is boiled for 2 hours under gentle reflux, a further 150 ml of vinyl chloride are added, and the mixture is refluxed for a further 14 hours. 400 ml of tetrachloroethane are added, and the mixture is distilled until a residue of about 250 ml remains. After cooling, the reaction mixture is stirred into 2.5 l of ether. The colorless flakes are filtered off with suction, washed with ether and dried in vacuo. Yield: 12.4 g (95%)

Example 4

Reaction of the sulfonyl chloride polyether ketone with primary or secondary amines (general procedure)

1.60 g (32.6 mmol) of the sulfonyl chloride polyether ketone from Example 3 are dissolved under nitrogen in 25 ml of chloroform. From 25 to 70 mmol of the amine are subsequently added dropwise at about 0° C. After the reaction mixture has been stirred at room temperature for about 16 hours, it is poured slowly into 750 ml of methanol. The flake-form product is filtered off with suction and treated with 600 ml of ether. The product is dried at about 80° C. in vacuo. Yield: 56 to 86%

EXAMPLE 5

Production of a membrane

Sulfonated polyether ketone prepared as described in Example 2 (degree of sulfonation 90%) was dissolved in DMF (concentration: 100 to 300 g/l), and the solution was drawn over a glass plate using a 0.2 mm hand coater. The DMF had evaporated within 15 hours. The glass plate was then placed in water. The polymer film detached itself from the glass. After equilibration in aqueous KCl solution, the film thickness was greater than 27 μm.

The water absorption capacity of the film is less than 50% at room temperature and about 1900% at 80° C. However, the membrane remains stable during water absorption. The perm selectivity of the membrane is about 90%. The membrane is still soluble in dimethylformamide even after irradiation with a 700 W mercury low-pressure vapor lamp (30 min). The water absorption capacity is not changed by the irradiation.

EXAMPLE 6

Production of a membrane

A sulfonamide of the formula (XII) (a=about 0.95, c=about 0.05) in which the radical NHR is derived from methyl p-aminocinnamate was prepared by the process of Example 4. 20 g of the sulfonamide and 80 g of the sulfonic acid of Example 2 were dissolved in 1 l of DMF, and films were produced from the solution by the process of Example 5. After equilibration in KCl solution, the film thickness was about 3 μm.

Irradiation for two hours at a distance of about 5 cm with a 300 W UV lamp caused partial [2+2]-cycloaddition of the cinnamic acid double bond.

Whereas the water absorption capacity of the film (at 85° C.) was about 1800% before the irradiation, it dropped to 400% after the irradiation. The perm selectivity of the membrane is about 90%.

EXAMPLE 7

In order to produce the cation exchanger membrane, 25 g of sulfonated polyether ether ketone ketone having a degree of sulfonation of 90% are dissolved in 100 ml of dimethylformamide. The homogeneous solution is cast onto a glass plate and distributed on the surface with the aid of a hand coater having a wet-film thickness of 350 μm. After the membrane had been dried at room temperature for 24 hours, it was detachable in a water bath. The mean thickness of the membrane after equilibration in distilled water at room temperature was 65 μm.

The catalyst is applied by hot pressing at 130° C. giving a platinum coating rate of 5 mg/cm² of membrane area. This membrane was installed in a water electrolysis test cell having a membrane area of 1 cm².

In the measurements, the membrane exhibited a stable behavior up to 80° C. The cell potential was 2.15 volts at a temperature of 80° C. and a current load of 1 A/cm². The internal resistance in electrolysis operation at 80° C. was 185 mohm.

During a long-term test at 80° C. under a load of 1 A/cm², the membrane proved to be stable over a period of 191 hours.

EXAMPLE 8

A membrane produced and coated as described in Example 7 was installed in a hydrogen/oxygen fuel cell having a membrane area of 12 cm². The membrane proved to be heat-stable up to a temperature of 80° C. In operation at an excess pressure of 1 bar on both the hydrogen and oxygen sides, a cell voltage of 700 mV was produced at a load of 175 mA/cm².

We claim:

1. A process for the production of a polymer electrolyte membrane from sulfonated, aromatic polyether ketone, in which an aromatic polyether ketone of the formula (I)

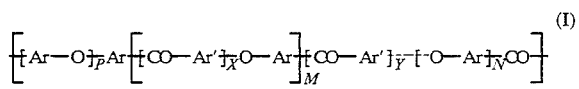

in which

Ar is a phenylene ring having p- and/or m-bonds,

Ar' is a phenylene, naphthlene, biphenylene, or anthrylene divalent aromatic unit, X, N and M, independent of one another are 0 or 1, Y is 0, 1, 2 or 3, P is 1, 2, 3 or 4, is sulfonated, the sulfonic acid is isolated and dissolved in an organic solvent, and the solution is converted into a film, which comprises converting at least 5% of the sulfonic acid groups in the sulfonic acid into sulfonyl chloride groups, reacting the sulfonyl chloride groups with an amine containing at least one ethylenically unsaturated Polymerzable radical or a furfuryl functional group, where from 5% to 25% of the original sulfonic groups are converted into sulfonamide groups, subsequently hydrolyizing unreacted sulfonyl chloride groups, isolating the resultant aromatic sulfonamide and dissolving it in an organic solvent, converting the solution into a film, and then crosslinking the ethylenically unsaturated polymerizable radicals and/or furfuryl functional groups in the film.

2. The process as claimed in claim 1, wherein the amine is allylamine, P-aminocinnamic acid or $C_1$-$C_4$-alkyl ester of P-aminocinnamic acid.

3. The process as claimed in claim 1 wherein the amine is 2-aminomethylfuran.

4. A process as claimed in claim 1, wherein the sulfonic acid used has the formula (II)

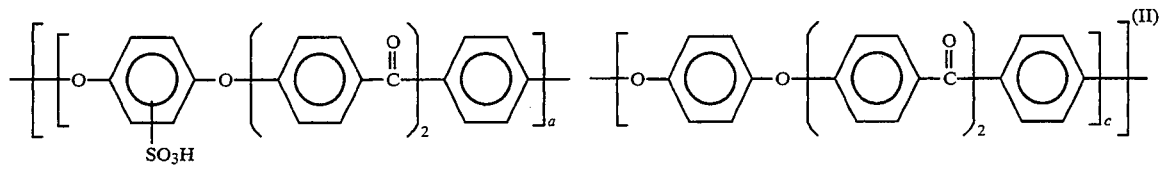

where a=0.2 to 1.0, c=0 to 0.8, and A+c=1.

5. A process as claimed in claim 1 wherein the sulfonic acid used has the formula (III)

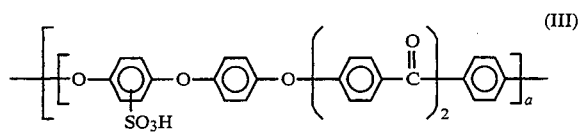

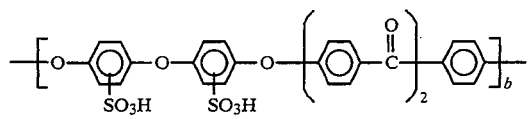

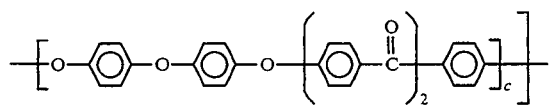

where
a=0 to 1,
b=0 to 1,
c=0 to 0.05, and
a+b+c=1.

6. The process as claimed in claim 1, wherein polyether ketone is a polymer of the formula (IV)

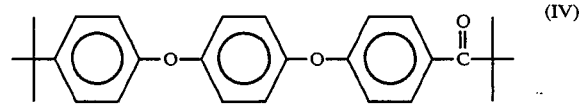

which is sulfonated until a degree of sulfonation of from 0.5 to 1.0 is reached.

7. The process as claimed in claim 1, wherein the polyether ketone is a polymer of the formula (V)

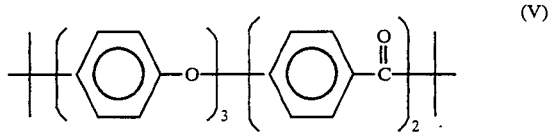

which is sulfonated until a degree of sulfonation of from 0.5 to 1.0, based on the sulfonatable O-phenylene-O units, is reached.

8. The process as claimed in claim 1, wherein the polyether ketone is a polymer of the formula (VI)

$$\left[\left(\bigcirc\right)\!-\!O\right]_2\!\left[\left(\bigcirc\right)\!-\!\overset{O}{\underset{\|}{C}}\right]_2$$  (VI)

is sulfonated until a degree of sulfonation of from 0.5 to 1.0 based on the sulfonatable O-phenylene-O units has been reached, and the isolated sulfonic acid is converted.

9. The process as claimed in claim 1, wherein the polyether ketone is a polymer of the formula (VI)

$$\left[\left(\bigcirc\right)\!-\!O\right]_2\!\left[\left(\bigcirc\right)\!-\!\overset{O}{\underset{\|}{C}}\right]_2$$  (VI)

which is sulfonated until a degree of sulfonation of from 0.6 to 0.8 based on the sulfonatable O-phenylene-O units is reached.

10. The process as claimed in claim 1, wherein the polyether ketone of the formula (I) is dissolved in from 94 to 97% strength by weight sulfuric acid, a sulfonating agent is added to the resultant solution until the sulfuric acid concentration is from 98 to 99.5% by weight, and the reaction batch is worked up as soon as the desired degree of sulfonation has been reached 11. The process as claimed in claim 10, wherein the crosslinking is effected by high-energy radiation or heat.

* * * * *